2 Sheets--Sheet 2.

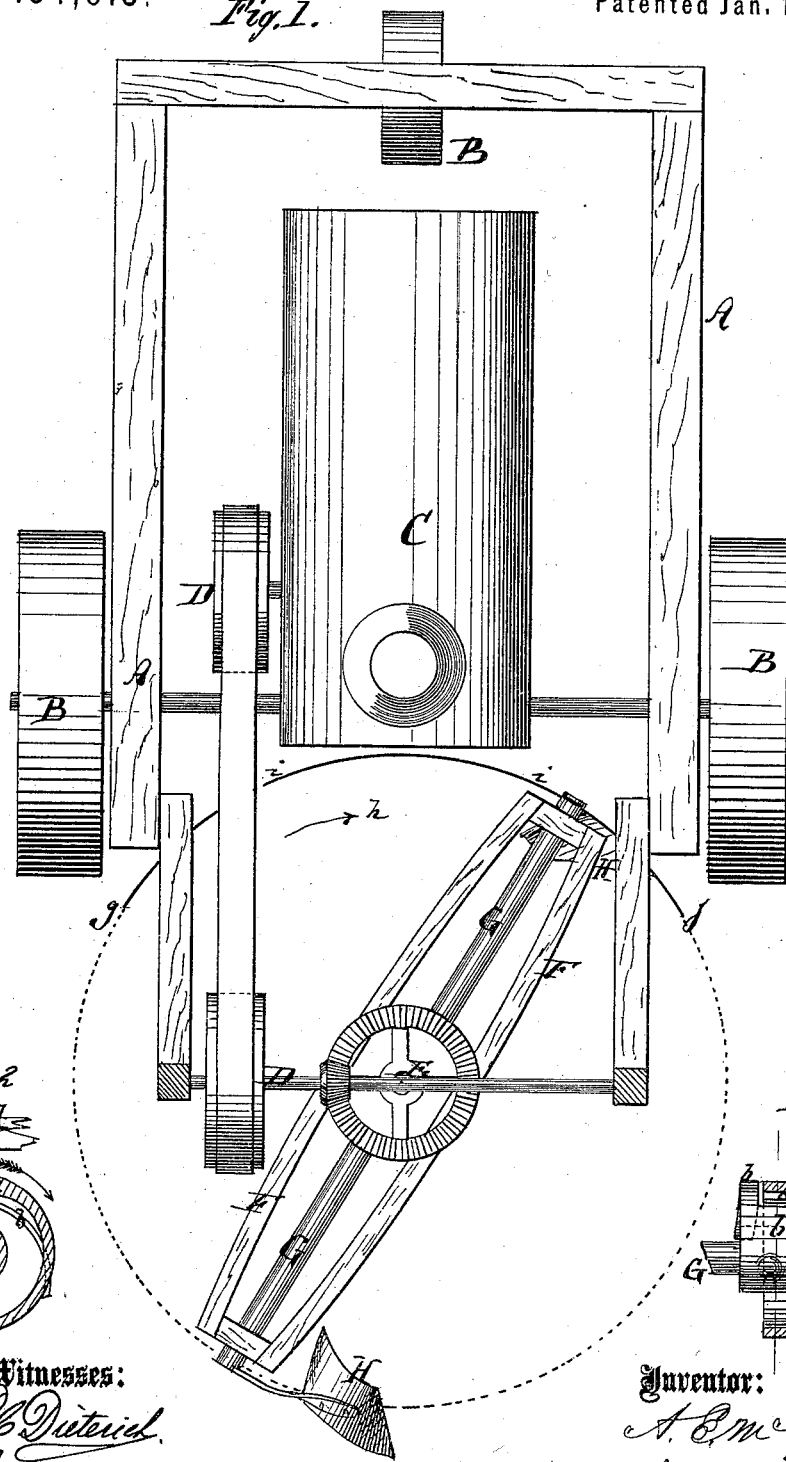

A. E. McGAUGHEY.
Steam-Plows.

No. 134,913. Patented Jan. 14, 1873.

Witnesses:
P. C. Dieterich
C. Seguine

Inventor:
A. E. McGaughey
PER Munn & Co
Attorneys.

AM. PHOTO-LITHOGRAPHIC CO. N.Y. (OSBORNE'S PROCESS.)

UNITED STATES PATENT OFFICE.

ALBERT E. McGAUGHEY, OF EAST MINNEAPOLIS, MINNESOTA.

IMPROVEMENT IN STEAM-PLOWS.

Specification forming part of Letters Patent No. 134,913, dated January 14, 1873.

*To all whom it may concern:*

Figure 4:
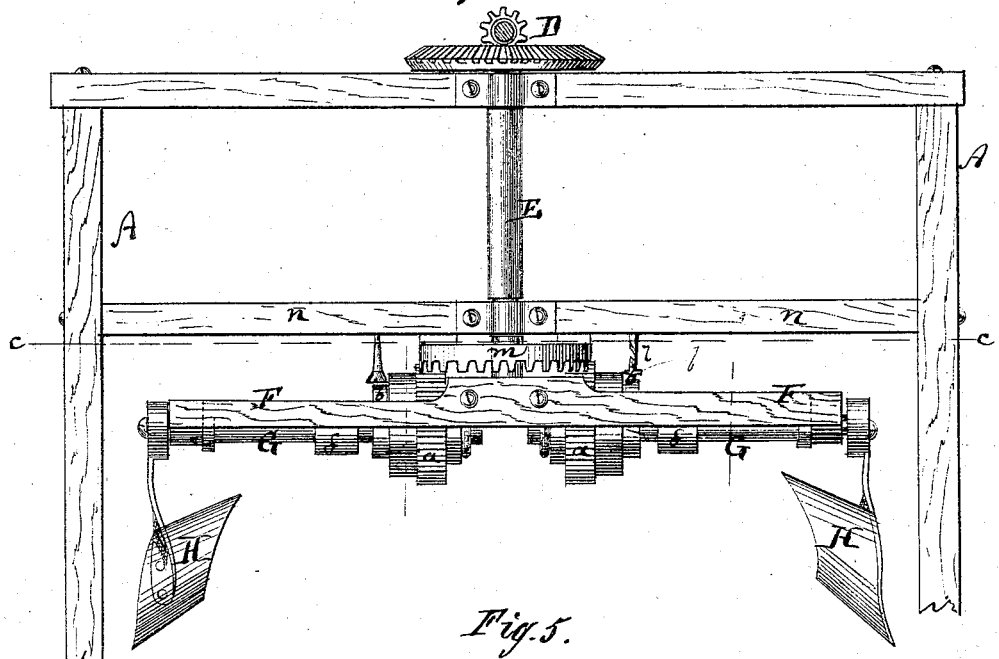
Figure 5:
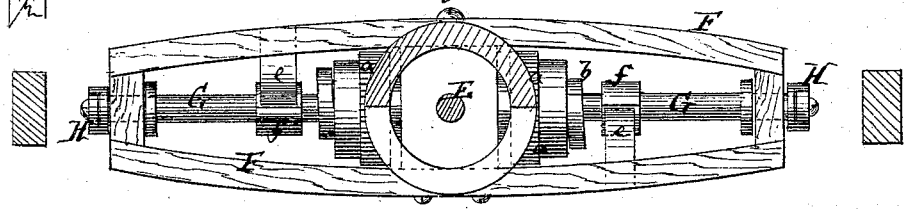
Figure 6:
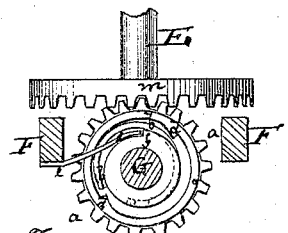
Figure 8:
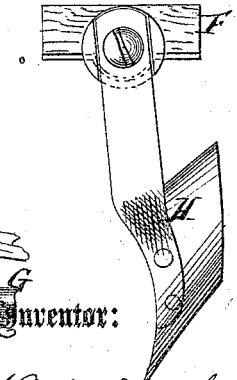
Figure 7:
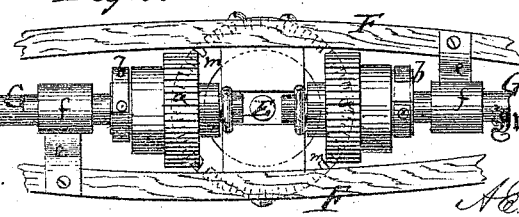

Be it known that I, ALBERT E. McGAUGHEY, of East Minneapolis, in the county of Hennepin and State of Minnesota, have invented a new and Improved Steam-Plow, of which the following is a specification:

Figure 1 is a top view of my improved steam-plow. Fig. 2 is a vertical transverse section; and Fig. 3, a longitudinal section of part of the horizontal plow axle and pinion. Fig. 4 is a front elevation of the plow; Fig. 5, a horizontal section on the line $c$ $c$, Fig. 4. Fig. 6 is a transverse section of the horizontal plow-axle; Fig. 7, a detail bottom view of the spider-frame; and Fig. 8, an end view of the spider and side view of one of the plows.

Similar letters of reference indicate corresponding parts.

This invention relates to a new arrangement of plows to be operated by steam-power with the object of carrying on the operation with the smallest attainable loss of power. The invention consists principally in rotating the plows at once around a horizontal and around a vertical axle, and utilizing about one-third of their horizontal sweep for active work in the ground, thus producing curved furrows. While in the ground each plow does not turn with its horizontal axle, but only on the vertical. At the end of each furrow the plow having made it is swung on the horizontal axle, and thereby carried off the ground, making one entire revolution around the horizontal axle, and meanwhile about two-thirds of a revolution around the vertical, before re-entering the ground. By this means great power in plowing is utilized. The invention further consists in such a connection of the horizontal plow pivots or axles with the pinions or wheels turning them that the turning will only take place after the completion of the furrows, and not during the making of them. For this object spring-clamps are used.

In the accompanying drawing, the letter A represents the frame of the plow mounted upon wheels B B, and supporting the steam-boiler C and suitable machinery D for revolving the vertical shaft E hung in the front part of the frame. To the lower end of the shaft E is fastened a frame or spider, F, in which horizontal axles G G, carrying the plows H H at their outer ends, have their bearings. These axles G carry pinions $a$ $a$ at their inner ends, which pinions are in gear with a stationary inverted gear-wheel, $m$, that is rigidly fastened to a lower front cross-bar, $n$, of the frame A. The pinions $a$ are loose on the axles G, and are provided with tubular projections that embrace the axles. These tubular projections have projecting teeth or shoulders $d$ on the inner surfaces. To each axle G is fastened, within the embracing-shell of the pinion $a$, a spring, $b$, bearing at times with its end or with an edge against the tooth $d$ of the said shell. To the spider-frame F is fastened, at the side of each axle G, a spring-click, $e$, bearing against a notched shoulder, $f$, on G. When a plow in the vertically-suspended position arrives at the point $g$, Fig. 1, it is ready to commence a furrow, and, the spider being turned in the direction of the arrow $h$, Fig. 1, the plow will make the furrow indicated by the full-line curve $i$ in Fig. 1. When the plow arrives at the end of the furrow at the point $j$ the spring $b$ of its axle G bears against an inward projection, $d$, of the shell, and causes the pinion to revolve the shaft G. Thereby the plow is raised out of the ground and revolved once around the axis of G, while the vertical shaft E turns it to the point $g$ of the next furrow to be made. Then the plow is again down and held steady by the click $e$, fitting a notch in $f$. While the furrow is being made the spring $b$ does not connect the shaft G and pinion, being out of contact with the projection $d$. A pendent pin, $l$, on the cross-bar $n$ makes sure of such release of $b$, as it throws it down to bring its end off the projection $d$ at the time the plow arrives in the working position.

The furrow made by this construction of plow is curved about one-third of a circle, and substantially as long as the frame A is wide. The spider may have a suitable number of arms, shafts G, and plows.

Having thus described my invention, I claim as new and desire to secure by Letters Patent—

1. The rotary spider F carrying the plow or plows H on the rotating axle or axles G, as specified.

2. The shaft G carrying the plow H and combined with the pinion $a$ and spring $b$, as set forth.

3. The click $e$ arranged in combination with the spider F, shaft G, and plow H, as set forth.

4. A plow rotating around a vertical and horizontal axis, substantially as set forth.

5. The shafts E and G arranged in combination with the plows H, as set forth.

ALBERT EDWIN McGAUGHEY.

Witnesses:
J. W. POMEROY,
T. JACKSON, Jr.